R. R. MILLER.

INCANDESCENT LAMP SOCKET.

APPLICATION FILED DEC. 9, 1907.

Reissued Feb. 8, 1910.

13,081.

WITNESSES

J. R. Millward

M. R. Breckin

INVENTOR

Robert R. Miller.

BY

Alfred Wilkinson

ATTORNEY

UNITED STATES PATENT OFFICE.

ROBERT R. MILLER, OF TOLEDO, OHIO, ASSIGNOR, BY MESNE ASSIGNMENTS, TO PASS & SEYMOUR, INC., OF SOLVAY, NEW YORK.

INCANDESCENT-LAMP SOCKET.

13,081. Specification of Reissued Letters Patent. Reissued Feb. 8, 1910.

Original No. 813,568, dated February 27, 1906, Serial No. 239,390. Application for reissue filed December 9, 1907. Serial No. 405,836.

*To all whom it may concern:*

Be it known that I, ROBERT R. MILLER, a citizen of the United States, residing at Toledo, county of Lucas, and State of Ohio, have invented a new and useful Improvement in Incandescent-Lamp Sockets, of which the following is a specification.

This invention relates to improvements in incandescent-electric-lamp sockets; and it consists of certain novel features hereinafter described and claimed.

In the incandescent-lamp sockets most commonly used the electric current is turned on and off by means of a rotatable key. To turn the key, the operator ordinary uses but one hand, grasping the key only, and unless the lamp-socket is upon a rigid fixture the wires are subjected to an unnecessary strain, often destroying the insulation and breaking the wires, and the filament of the lamp is in danger of being broken by the jar upon it every time the key is turned to open and close the circuit.

One object of my invention is to provide a lever by means of which the circuit may be either opened or closed, while the lamp-socket is grasped and firmly held in one hand by a pressure of the thumb or finger of that hand upon the switch lever.

A further object is to provide a lamp-socket of fewer parts and of more compact and stable construction, the same being adapted for attachment to the various forms of incandescent lamps, including the Edison, the Sawyer & Mann, and the Thomson-Houston.

To these ends the invention consists in the improvements which I will now proceed to describe and claim.

Figure 4:
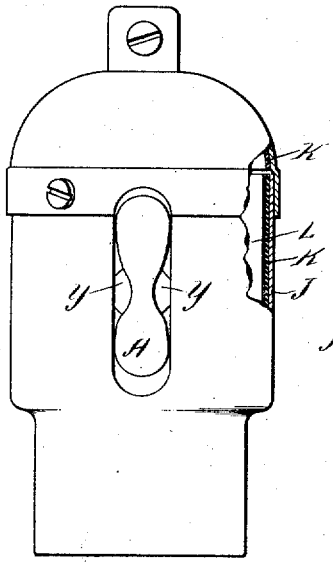
Figure 2:
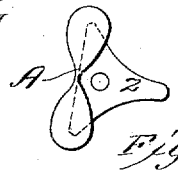
Figure 1:
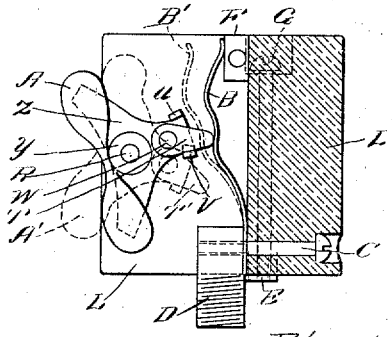
Figure 3:
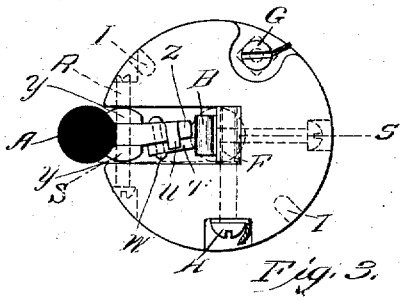
Figure 6:
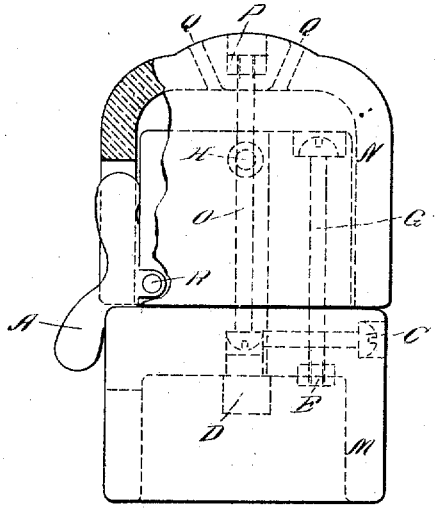
Figure 5:
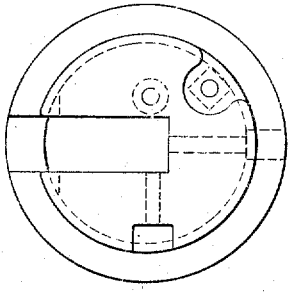

In the accompanying drawings, forming a part of this specification, Figure 1 is a vertical sectional view of the mechanism along the line S S of Fig. 3. Fig. 2 is an isometric view showing an alternote form of construction of the switch-lever. Fig. 3 is a plan view of Fig. 1. Fig. 4 is an elevation of a metal-cased socket, partly in section. Fig. 5 is a top view of the lower section of an all-porcelain socket, showing the porcelain only; and Fig. 6 is an elevation of an all-porcelain socket. By an "all-porcelain" socket I mean a lamp-holder and socket in which all metallic parts and connections are contained in a porcelain body, making a lamp-socket complete without a metal jacket.

The same letters of reference indicate the same parts in all the figures.

In the drawings, A represents the external portion of the switch-lever, presenting a flattened surface on which to apply the pressure of the thumb or finger required to operate the lever.

Z is the switch-lever proper, fulcrumed at R, near the center of what is, in effect, a triangle, with each acute angle thereof an arm of the lever. The external portions of the switch-lever will be made entirely of hard rubber or other suitable insulating material. The spring B is held by the screw C firmly between the center contact-post D and the porcelain body L, and said spring is adapted to close the circuit when pressed and firmly held by the lever against the nut F and to break the circuit by springing away from its contact with the nut F into the position shown by the dotted line B′. In order to accomplish a quick breaking of the circuit when the spring B is released from its contact with the nut F, I provide as a preferable form of construction an extension-lever T, pivoted to the main switch-lever at W and fulcrumed thereon by the two raised clips U and V. As will be readily understood, when the switch-lever and the spring are in the position shown by the dotted lines and pressure is applied upon the then elevated arm of the external portion of the switch-lever the clip V engages the extension lever T and forces it against the spring B until the spring is thus forced into contact with the nut F, where it is held until a reverse motion of the switch-lever allows the spring by its own elasticity to break away from its contact with F. To break the circuit, pressure is applied to the then elevated external arm of the switch-lever until the clip U engages the extension-lever T, causing it to move downward along the spring B, still holding it in contact with F until the free end of the lever T has passed the slightly curved portion of the spring B, when the tension of the spring throws the lever T suddenly down upon the lug V, allowing the spring entire freedom to break quickly away from its contact with the nut F.

An alternate form of constructing the switch-lever is shown in Fig. 2, which lever may be found to operate quickly enough for all practical purposes without using an auxiliary or extension lever thereon.

The screw H, engaging the nut F, is also a binding post adapted to clamp one of the supply-wires.

The width of the secured end of the spring B is such as to fit snugly in the rectangular opening in the porcelain block L, while the free end thereof is narrower to allow it to move freely in said opening. The center contact-stud D is slightly flattened on one side or recessed to receive the spring B and is held securely in place by the screw C, which screw serves the double purpose of holding the spring B and the stud D in position.

The screw G is a binding-post to which the other feed-wire is attached, and the nut E upon said screw is adapted to connect with the outer lamp-contact directly in the Thomson-Houston base or by suitable connection to the flanges of the Sawyer & Mann socket or the screw-thread socket of the Edison lamp.

The recesses I in Fig. 3 are adapted to receive the ends of the screws that hold the metallic casing together and to hold the porcelain block in position in the metal case J. A fiber lining K, required by underwriters, is placed between the metal jacket and the porcelain block. The block L is preferably made of one solid piece, but can be made of two halves properly notched or otherwise fitted together. On either side of the lever Z, I provide a friction-washer Y to assist in retaining the lever in its proper position.

In adapting this mechanism to an all-porcelain socket the body of the socket is made in two parts, the upper portion N through which the live wires enter at Q Q, telescoping upon the lower portion M and being held thereon by the countersunk screw O and the nut P, which nut is sealed in an opening in the top of the part N. Thus there is no metallic portion exposed, and the socket can be united or separated without disturbing the stud D.

The construction and arrangement of the several parts being thus made known, it is thought that the operation of the device will be readily understood.

The path of the current when the lamp is turned on is by a conducting-wire upon the screw binding-post G, thence to the nut E, to the outer lamp-contact, thence through the lamp by the center lamp-contact, to the stud D, to the spring B, to the nut F, to the screw binding-post H, and to the other conducting wire. The method of making and breaking a circuit has already been fully explained.

Having thus described my invention, what I claim, and desire to secure by Letters Patent, is—

1. In an incandescent-lamp socket, a triangular switch-lever fulcrumed at or near the center of the triangle and having upon the inner arm thereof an extension-lever, pivoted thereto and fulcrumed thereon by projections upon the switch-lever on either side thereof and spaced a little wider than the width of the extension-lever, adapted to engage a spring contact-piece to close the circuit and to quickly release the same in breaking the circuit, all substantially as described.

2. In an incandescent-lamp socket, the combination of an insulating-block L, the center contact-stud D, the contact-spring B secured to the stud by the screw C set at an angle to prevent the turning of the stud D, the nut F connected with one of the circuit-wires and adapted to complete a circuit by contact with the spring B, and the triangular switch-lever pivoted on the fulcrum R at or near the center of the triangle and adapted to engage the spring B to open or close the circuit by pressing upon the alternately-elevated outer arms of said lever, all substantially as set forth.

3. In an incandescent-lamp socket, the combination of an insulating-block M, an insulating-block N adapted to telescope thereon, the bolt O and nut P, the outer contact-screw G and nut E, the center contact-stud D, the contact-spring B secured to the stud D by the screw C set at an angle to prevent the turning of the stud, the nut F connected with a circuit wire and adapted to complete a circuit by contact with the spring B, and the triangular switch-lever pivoted on the fulcrum R near the center of the triangle and adapted to engage the spring B to open or close the circuit by pressing upon the alternately-elevated outer arms of said lever, all substantially as set forth.

4. In an incandescent lamp socket, a rocking-lever suitably pivoted in the socket, an extension-lever pivoted to the inner end of the rocking-lever, means to limit the swing of the extension-lever on the rocking-lever, and a spring-piece adapted to make and break the circuit, said extension-lever being adapted to engage with the spring-piece to close the circuit and to release the spring-piece and open the circuit, as the rocking-lever is rocked in one direction or the other.

5. In an electric lamp key socket, a porcelain base, a rocking lever suitably pivoted in an opening in the base, said lever having two ends adapted to extend alternately beyond the outer surface of the socket to be engaged in turn by the hand, an extension lever pivoted to the inner end of the rocking lever, means to limit the swing of the extension lever on the rocking lever, and a spring-piece suitably supported on the base and adapted to make and break the circuit, said extension lever being adapted to engage with the spring-piece and operate the spring-piece alternately to make and break the circuit, as the rocking-lever is rocked in one direction or the other.

6. In an incandescent lamp socket, a rocking-lever suitably pivoted in the socket, means to make and break the circuit, an engaging part carried by the rocking-lever in position to cause making and breaking of the circuit by its engagement upon the rocking of the lever, said part being permitted a slight free movement to permit a quick breaking of the circuit.

7. In an incandescent lamp socket, a suitable base of insulating material, a rocking key-lever suitably pivoted in an opening in the base, said lever having two ends adapted to extend alternately beyond the outer surface of the socket to be engaged in turn by hand, and an inwardly extending engaging part, a spring-piece suitably supported on the base and adapted to make and break the circuit, said key-lever engaging part being adapted to engage with the spring-piece and operate the spring-piece alternately to make and break the circuit as the key-lever is rocked in one direction or the other and said spring-piece being formed with a convex portion intermediate of the positions assumed by the engaging part when the key is rocked.

In testimony whereof, I have signed my name to this specification, in the presence of two subscribing witnesses.

ROBERT R. MILLER.

Witnesses:
W. H. Roose,
Fordyce Bilford.